8849X
J. Kirkpatrick.
Steam-Engine Valve-Gear.
Patented May 29, 1835.
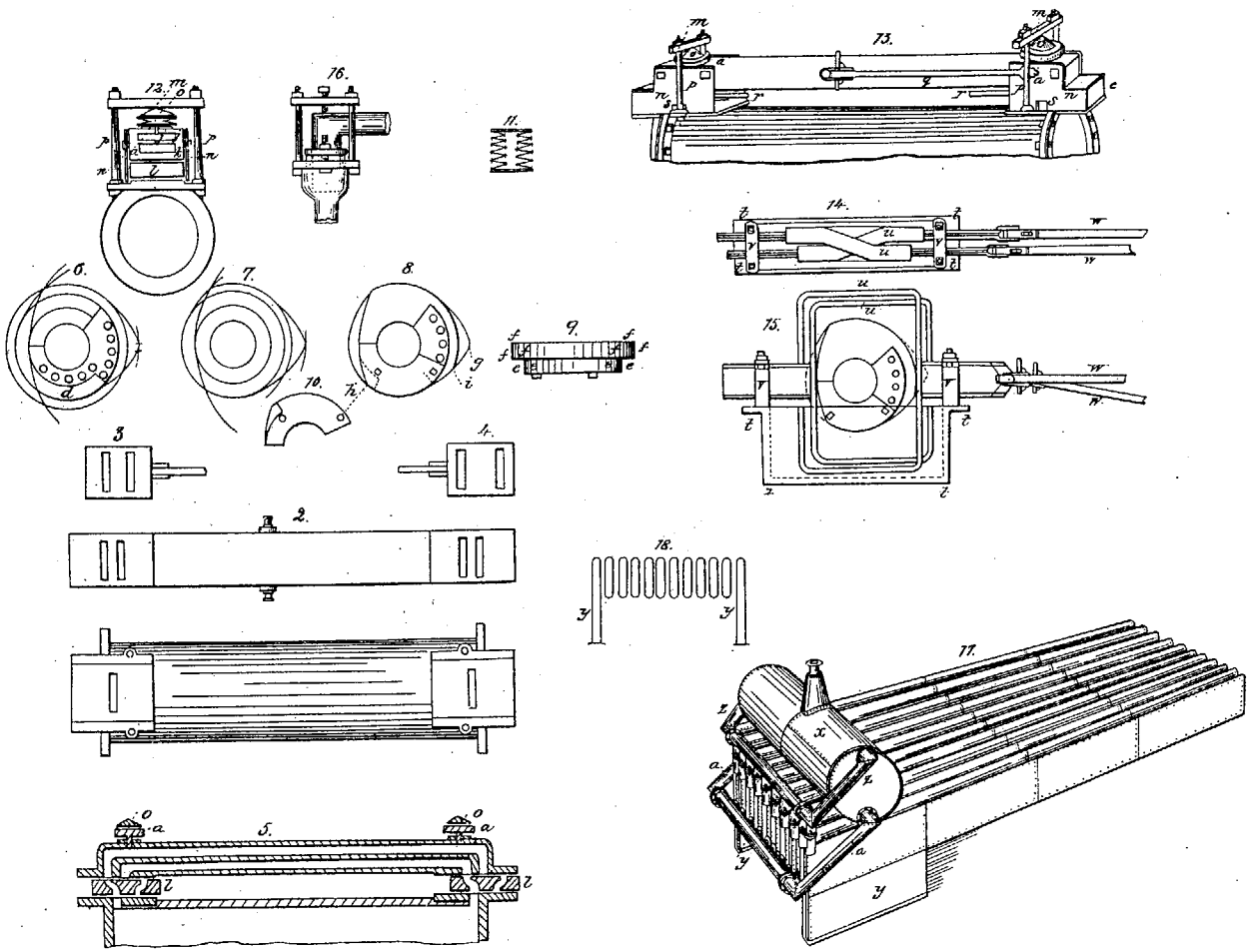
AM. PHOTO-LITHO. CO. N.Y. (OSBORNE'S PROCESS.)

May 29. 1835 141

8849X

* John Kirkpatrick
Letters Patent
No 525.

The Schedule referred to in these Letters Patent and making part of the same containing a description in the words of the said John Kirkpatrick himself of his improvement in the Boilers, Valves and Cam of the Steam Engine

---

To All to Whom these Presents shall Come. Be it known that I John Kirkpatrick of the City of Baltimore in the State of Maryland have invented certain new and useful improvements in the Steam Engine, which improvements I denominate the plate valve, the cross yokes, the Double Cam, the reacting drum, the circulating boiler and receiver, and the steam damper and that the following is a full and exact description of the construction and operation of the said machinery as invented or improved by me, reference being had to the drawing which accompanies and makes a part of this description; The plate valve as the name implies is a flat plate. it has two openings through it obliquely one for the admission of Steam from the steam passage of the side pipe into the cylinder, the other for the escape of steam from the cylinder into the escape passage of the side pipe, these operations are alternately perform ed as the valves at each end of the cylinder are moved by the double cam to be presently described, which likewise sets the space of each valve over the openings when required to shut off during Stroke. The move able projection plate although used and described is not a part of this patent being formerly patented by me in the shifting Cam. No 1 in the accompanying drawing represents a cylinder with two faces suitable for plate valves. No 2, is a view of a side pipe suitable to No 1. No 3 is a view of that side of a plate valve next to the cylinder and suitable to Nos 1 & 2. No 4. Is a view of the side of a plate valve next the side pipe and suitable to Nos 1 & 2. No 5 is a longitudinal section of the side pipe, valves and a portion of the Cylinder corresponding to the above, also the drums d.d. each of which is composed of two plates of steel or other metal riveted through a ring or hoop on (* Additional improvement [illegible] added [illegible] 1841)

on the outer edges and connected with the steam passage of the side pipe j.
No 5. the self balancing principle being applied without a piston by the elas-
ticity of the plate. greater elasticity can be obtained by making the sides of
the drum in the form shown at Nos. 11 & 12. the outer edges may be secured
firm by the inner ones turned and ground to fit steam tight, or put to-
gether with joints; k, is the exhaust passage of the side pipe. No. 6. is a
view of that side of the Cam used in exhausting without the half stroke plate.
the dark part represents the recess in which the plate slides. The projection
b no. 10. moves in the space d. No. 6. No 7 represents that side of the cam which
alternately opens the valves at each end of the cylinder for the admission of
steam. No 8 is a side view of the whole cam, with the half stroke plate at-
tached which is half the thickness of the exhaust of the cam, the projec-
tion being of the same thickness reaches entirely across that side of the Cam.
The line left at No. 6 and No 7. compared with No 9 sufficiently illus-
trate the formation of No. 8. - e, e, No. 9. is an edge view of No. 6. and f, f.
No. 9 is an edge view of No. 7. No 9 is an edge view of the whole double
cam No 8. which requires 2 yokes as shown at No 14. & 15. they cross each oth-
er and are acted upon alternately by the points of each side of the double cam.
the point g No. 8. opens to let on steam, the point h, shuts off during the stroke.
and the point i, exhausts, this valve then remains stationary, till the
other performs similar operations, when it in turn remains Stationary,
and the first commences as before, and so they continue onward alternate-
ly changing operation. No 10 Is a cross section of the Cylinder side pipe
valves and guides, j. is the side passage. k, the exhaust passage. l. the valve.
m. the cross bar. n. the guides. o. the conical plate which is pressed against
the drum by the action of the screws. on the columns p. p. through the cross-
bar m. by which means the degree of pressure on the valve is regulated.
No. 13 Is a perspective view of No. 5. with the necessary appurtenances attach-
ed. q, is one of the two rods that hold the weight of the side pipe when ver-
tical and prevent it from moving longitudinally when horizontal. r. r.
are the valve rods and S. S. the holes in the guiding plates through which
the movements of the valve are observed when at work, all other parts of 13 are
explained by the corresponding parts of No 12 and No 5. In No 14 & 15. t, t, t, t.
represent represent the four corners of the air box upon which the two pillow blocks
O. O. are cast solid; w. w. are the two Cam yokes and w. w. the cam rods.
No. 16 is a view of an elbow pipe and stuffing box that may sometimes be
necessary: to prevent the side pipe from pressing too forcibly against the
guides. Twice the width of the opening added to the difference between
the width of the opening and that of the valve space (which covers the opening
in the cylinder when shut off during the stroke) is the whole distance through
which the valve is required to move; in opening the whole distance is
passed through at one move, but in returning one half the distance is first
passed through to shut off during the stroke and the remainder at proper
time to exhaust (this motion is particularly applicable to one modifica
tion for the condensing engine of the self balancing slide valve formerly
patented by me) No. 17 and 18, are different views of a boiler which I call a
circulating Boiler and which may be composed of one or more regular par
allels or other formed longitudinal vessels, exposing to the action of the fire
the whole surface excepting the ends which on account of convenience in
making may be cast, the forward end having two pipes cast on it, one
at the top for the steam to pass out at, and one at the bottom for the water
to pass in at, the back head has one hole cast in it at the bottom, into
which a scraper or brush can be passed to clean out the boiler, No. 17 is a pers
pective view of a large circulating Boiler composed of ten small ones, con
nected with a circulating receiver X. No. 18, is a transverse section of No. 17.
at the furnace and under the receiver; the letters of designation are common
to both. Y. Y. represents the legs of the outside parallels which form the sides
of the furnace and are necessary only on board of boats to avoid weight, the
intermediate ones form the top and have sufficient space left between
them for the passage of flame which is conducted into the chimney at
the back end, The size of the receiver should be of such proportion to that
of the Boilers and of the surface they expose that the water which fills the
Boilers only when cold will fill about one half the receiver in addition
when at a proper temperature to generate a continual supply of steam
for the Engine, Those Boilers having the greatest exposure of surface in
proportion to the quantity of water they contain and being subjected to the
most

8849X most intense heat, will require the capacity of the receiver to be greatest in proportion to that of the boiler. The Boilers being all connected at the top of the pipes z. z. with the top of the receiver R. the steam passes freely into the receiver taking with it a portion of water which immediately settles down and passes back in to boilers by the pipes a, a, which connect the lower part of the receiver with the lower part of each of the boilers and preserves an equilibrium between the boilers and receiver, excepting the difference in gravity, between the ascending column of steam and water and the descending column of water only added to the difference in altitude between the boilers and receiver, the former difference preserves a continual circulation between the boilers and receiver while generating steam; and the latter insures a supply of water to each of the Boilers, while there is any in the receiver which should always be about half full when the steam is at a proper height. The stay bolts which are to pass through parallels of this boiler should be of sufficient strength to bear twice the pressure to be applied without straining (which may be tested by a hydraulic apparatus) they ought to be put in without thimbles before the sides of the parallel are rivetted at the edges, having shoulders to receive the sheet, they should be small and numerous as by that means the sheet may be thinner and the rivetting more easily done cold, besides the advantage of calorie passing more readily through a thin sheet, it is less apt to blister than a thick one, and as nearly the whole surface is exposed to the fire, there is little danger of rust but if thimbles are used they should have holes in them to admit the water to circulate freely round the bolts. The same rules should govern the builder respecting the strength of material and exposure of surface in this as in other Boilers where the same pressure is applied and the same kind of fuel made use of. Short boilers constructed for burning coal may have the receiver made as represented in the accompanying drawings. But for long Boilers calculated to burn wood as on board of boats the receiver can be made about the length of the Boilers and set Longitudinally to suit that arrangement of engine most common in high pressure boats, the steam being taken out of the back end. The flame may allowed to return under the receiver receiver after a sufficient supply of water has been forced into it by the
action of the fire upon the water in the Boilers, until then the flame
must be let into the chimney by means of a seperate flue without com-
ing in contact with the receiver, which must always be done when the
water is low in the receiver from any cause, it is only in land engines
that much benefit can be effected from using the flame returning
under the receiver, the weight of a seperate flue and casing being too
great for Boats. In setting such Boilers it is necessary to place the end
connected with the receiver highest that the steam may pass from the boil-
ers into the receiver as fast as it is generated. The casing or brick work
should come close to the bottom of the boilers to confine the flame principally
between them the top to be covered with brick work or the upper part
of the Boilers may be so formed as to meet, the boil- are cleaned out at an
opening in the lower part of the back head, which end being the low-
est is favourably situated for that purpose by opening one at a time
and pumping water into the receiver, a current will be sent through
each at such opening to assist in cleaning. The front of the ash pits
is made to shut close and a pipe connected with the lower part of the
escape steam pipe leads into it when the engine is stopped and steam
escaping, the fire may then be damped or even extinguished by merely
shutting the ash pit doors. These boilers afford various advantages in
the extent of surface exposed, the small quantity of water contained
the facility with which they can be constructed, repaired or transported
from place to place, the small space which they occupy and the high
pressure which they will bear compared with the low pressure boilers
now in use. Boilers have been to some extent used with a fire front
connected with the main boiler allowing the water therefrom to flow
in front of the fire, or the boiler has been fed by means of a force pump
passing water through the fire front, but by the arrangement adopted
by me each of the combine^d^ parallel Boilers becomes a generator, the
whole surface ^space^ of which may be exposed to the action of the fire as complete-
ly as are the tubes of tubular boilers, whilst by attaching a receiver for
the steam, and connecting therewith and with the Boilers two pipes oper-
ating

8849X ating upon the principle herein explained the steam and water are ef-
fectually seperated And the parallel boilers are each kept full of water
which continually flows into them through the lower pipes while their
inclined positions facilitate that operation. What I claim in this
part is forming a boiler by the combination of any number of what I
have called parallel boilers which are placed in an inclined posi-
tion to promote the passage of steam out, and the flow of water into
them and the placing above them a receiver connected by means of one
common steam tube with the upper edges of the parallel boilers and
by means of a second or water tube with their lower edges for the pur-
poses herein set forth. I also claim the manner of connecting the waste
steam pipe with the ash pit for the purpose of damping or extinguish-
ing the fire varying the particular arrangement of the respective parts
in any way which I may deem proper, whilst I do not depart from the
general principles or mode of operation. What I claim in the valve and cam
herein described is the particular arrangement of the openings of the
valve as shewn at fig 5. and the parts connected with it. the par-
ticular construction of the double cam, with its manner of action
through the medium of the cross yokes herein described and the adjustment
by which it is adapted to the purpose intended, the reacting drum,
applied upon the principles and for the purpose described, together with
such modifications and variations in the form and arrangement
of these parts which are substantially in accordance with the gen-
eral principle John Kirkpatrick Exd. Witnesses
WJC Sam Stettinius
R R Burr (Patented May 29. 1835) (2780 Words)

See Additional Improvements No. 1. granted
6th day of October 1837 - Vol. 1. page 1. Additional Improve-
ments.

(Drawing)